July 15, 1941.   H. V. INSKEEP   2,249,361
WELDING TIP
Filed Sept. 14, 1939
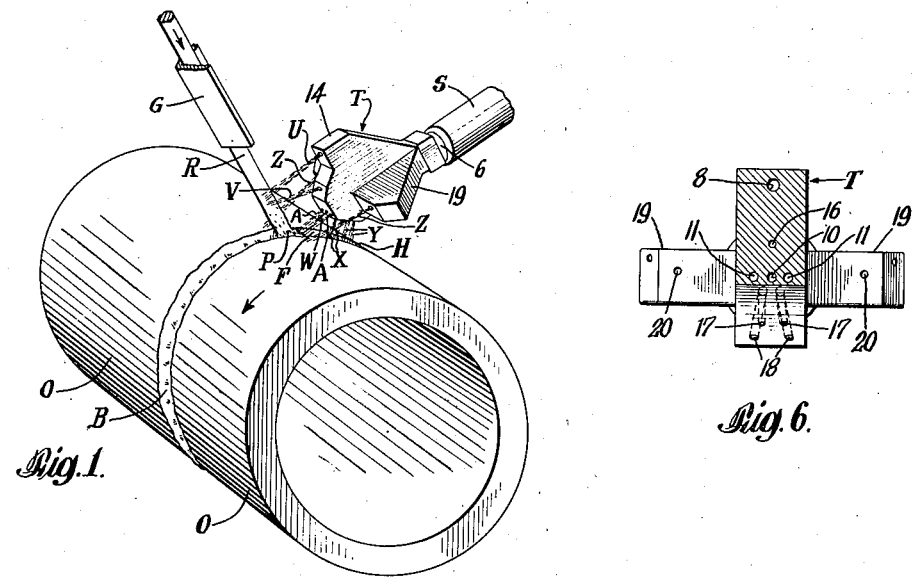
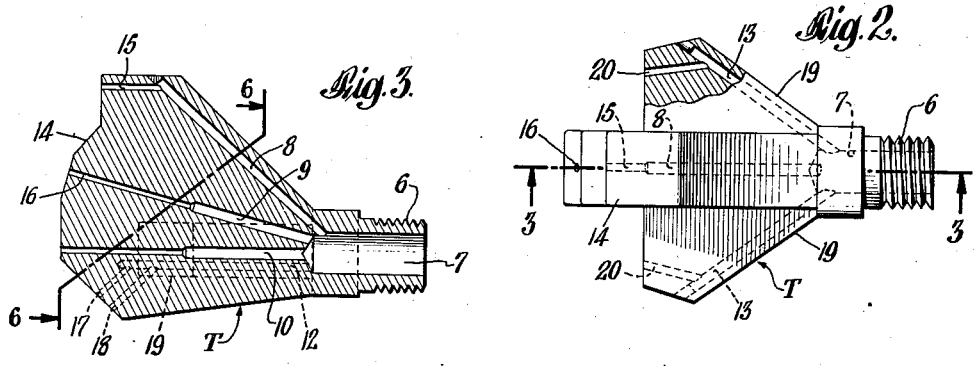
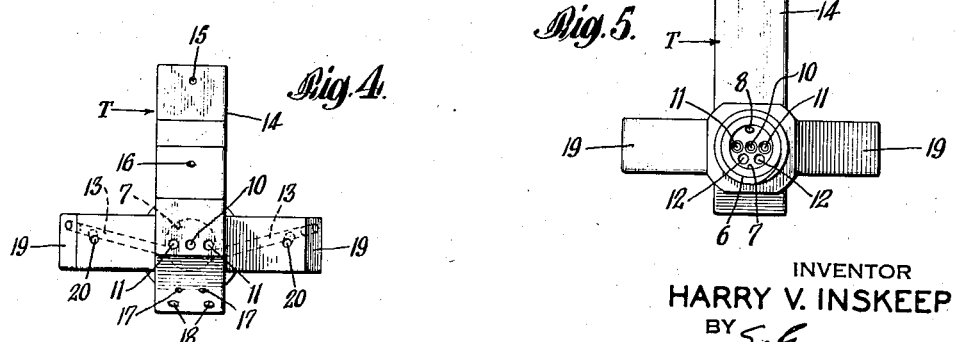
INVENTOR
HARRY V. INSKEEP
BY
ATTORNEY Patented July 15, 1941

2,249,361

UNITED STATES PATENT OFFICE 2,249,361

WELDING TIP

Harry V. Inskeep, Fanwood, N. J., assignor to Oxweld Acetylene Company, a corporation of West Virginia Application September 14, 1939, Serial No. 294,856

7 Claims. (Cl. 158—27.4)

This invention relates to gas welding and more particularly to the circumferential welding of relatively thick-walled pipe of relatively small diameter, such as oil well drill pipe.

In some cases, such qualities of a welded joint as high tensile strength, high fatigue resistance, and freedom from porosity are of exceptional importance. Thus, those skilled in the art have long sought a method of joining a length of heavy-walled drill pipe to a steel-threaded section which would result in a welded joint of higher quality than that which is possible by hand welding with either an electric arc or a single oxyacetylene flame. Because of the extremely severe service to which the resultant joint is to be put, the weld must be sound throughout, and have an exceptionally high tensile strength and a high yield point.

While the highest possible quality of weld is sought, it is desirable also to keep the cost as low as possible in this type of welding. Therefore, the main objects of this invention are to provide: a blowpipe tip by means of which the circumferential welding of thick-walled pipe of small diameter, such as oil well drill pipe, may be accomplished economically and effectively; a process of welding such pipe that is adapted for use with automatic and semi-automatic apparatus, and results in a uniformly sound weld of exceptionally high strength and fatigue resistance, and free from porosity; and a novel method of and means for multi-flame welding that is simple and highly efficient and effective for the purpose intended.

Drill pipe may have a wall thickness of about ⅜ inch or more, and an outside diameter of about 4½ inches. One end of such pipe, to be welded subsequently to a drill tool, is upset to provide a wall thickness of about ⁷⁄₁₆ inch, maintaining the same outside diameter. After welding, the inside of the welded joint is machined to restore the pipe to its original thickness; and the weld reinforcement is removed. In this way a uniform wall thickness around the circumference of the pipe at the joint is obtained. This assures an even stress distribution through the weld, minimizing the danger of fatigue failure.

Because of the high ratio of wall thickness to outside diameter of drill pipe, flame welding methods known to the prior art are almost wholly unsuitable for use in butt-welding such pipe. This is due mainly to the high rate at which heat is conducted away from the welding zone through the pipe, preventing the adequate application of preheat to the faces of the groove, such as a V, with the usual preheating flames in advance of the main welding flame. The high degree of curvature of the small outside diameter pipe renders ineffective additional work preheating flames or jets in a known multi-flame tip for welding plates. However, even the use of suitably modified additional work-preheating flames is not entirely satisfactory because, just before the weld is completed, the additional work preheating flames are unnecessary; the pipe having been suitably preheated by that time by conduction of heat from the welding zone. If a large number of work preheating jets are used during completion of the weld, the last half of the weld is overheated, resulting in an unsatisfactory weld.

Attempts to solve the foregoing problem by confining the application of preheat (in addition to that applied by a conventional multi-flame tip) to the first half of the circumferential seam being welded necessitate the use of automatic means for cutting off the extra preheating flames after the welding has progressed to a point where the pipe is preheated sufficiently by conduction from the already welded portion.

The present invention is based upon the discovery that, by using two widely spaced flanking flames, one on each side of and about ¾ inch from the center of the V, and in the same general plane as three principal welding flames of the tip, the time required for preheating is considerably reduced, and the welding speed is substantially increased. The passages for the flanking jets preferably are incorporated in the tip itself, their best arrangement with respect to the passages for the rest of the flame jets being determined experimentally. The jets preferably are so disposed and directed as to dam the heat at the welding zone, and thus lessen the heat flow from the molten puddle to the cooler base metal by decreasing the temperature differential. They also act to form a hot gaseous envelope over the molten puddle, thus keeping the metal molten longer, and permitting foreign inclusions to rise to the surface of the puddle. Their use also permits the use of a larger size welding rod than previously has been possible, and eliminates the need for lateral movement of the tip transversely of the weld seam during the operation.

Referring to the accompanying drawing, illustrating one form of welding tip of the invention, Fig. 1 is a perspective view of sections of drill pipe being butt-welded in accordance with this invention;

Fig. 2 is a top plan view of a welding tip embodying features of the invention;

Fig. 3 is a section taken along the line 3—3 of Fig. 2, looking in the direction of the arrows;

Fig. 4 is a view in front elevation of the welding tip of Figs. 2 and 3;

Fig. 5 is a view in rear end elevation of said tip; and

Fig. 6 is a section taken along the line 6—6 of Fig. 3, looking in the direction of the arrows.

The welding tip T preferably comprises a one-piece body of metal, such as copper plated with chromium, having a threaded neck portion 6 adapted to be coupled to the stem S of a blowpipe, such as a conventional oxyacetylene welding blowpipe. The tip T has therein a cylindrical gas inlet chamber 7 from which extend two rod-preheating flame gas passages 8 and 9; a main welding-flame gas passage 10; closely flanking auxiliary welding-flame gas passages 11, 11 disposed parallel to passage 10 on opposite sides thereof; two parallel work-preheating gas passages 12, 12; and two diverging and widely flanking heat-damming flame gas passages 13, 13. The main welding-flame gas passage 10 preferably is substantially axially aligned with the gas inlet chamber 7; while the axes of the rod-preheating flame gas passages 8, 9 lie in the central vertical longitudinal plane of the tip. The closely flanking auxiliary gas passages 11, 11 are disposed respectively in the longitudinal plane passing through the welding gas passage 10, and are directed to discharge their jets A, A into the V and against the faces thereof at either side of the main welding jet W from passage 10.

The rod-preheating gas passages 8 and 9 are situated in a nose or midportion 14 of the tip T, and have reduced outlet portions 15 and 16, respectively arranged to discharge gas jets U and V against spaced portions of a welding rod R as the latter is being fed longitudinally into the welding puddle P. A trough-like guide G for the rod R supports it for rotary or oscillatory movement as it is being fed into the puddle P. Any suitable means may be used for this purpose; or it may be done by hand. The gas jets U and V, when ignited, heat the lower end portion of the rod R so that it melts and flows at the proper rate into the molten puddle P as the welding progresses.

The work-preheating flame gas passages 12, 12, are disposed in parallel relation below the level of the gas passages 10 and 11. Each passage 12 has connected therewith respective forwardly- and downwardly-inclined gas outlet passages 17 and 18. The respective pairs of passages 17, 17, and 18, 18 are divergent forwardly, and direct preheating jets X, X and Y, Y, respectively, against the inclined end faces F, F of the pipe elements O, O. These end faces F, F are shaped and arranged to form the usual circumferential welding groove or V H, the pipe parts being held in fixed position relatively to each other during the welding operation by suitable means, such as a jig, or by tack welds, so that the pipe elements O, O may be turned as a unit in the direction of the arrow (Fig. 1). The work-preheating jets X, X and Y, Y properly prepare the faces F, F of the V H for the actual welding operation, which takes place in the zone of the puddle P of molten weld metal under the action of the three welding jets W and A, A.

The widely flanking flame gas passages 13, 13 are located in lateral wings 19, 19 of the tip T, and terminate in smaller gas outlet passages 20 which direct flanking jets Z, Z against the respective pipe elements O, O at points on the latter which are spaced transversely of the V H and equidistant from the latter on opposite sides thereof, the jets Z, Z being in a common transverse plane with the main welding jets W and A, A which operate within the V H. The flanking jets Z, Z are inclined inwardly and slightly downward, as shown, to concentrate the heat therefrom as much as possible at the welding zone, and to assist in the formation of a protecting gas blanket over the molten puddle and the adjacent areas.

Thus it will be seen that the welding tip has opposed laterally-disposed wing portions, and a narrow midportion extending forward of and vertically beyond the respective opposite principal surfaces of the wing portions. The arrangement of parts is such that the plurality of parallel welding gas passages in said midportion respectively discharge gas in parallel jets in a longitudinal plane passing through said wing portions; the plurality of rod-preheating gas passages within the midportion are directed to discharge jets of gas in a longitudinal plane perpendicular to the longitudinal plane passing through the welding gas passages, and at spaced points upon a body of weld metal; and the gas passages in the respective wing portions discharge gas in intersecting paths directed inwardly and slightly downwardly in front of the outlets of the main welding gas passages 10, 11.

In preparing the end margins of members to be joined, a 40 degree included angle of bevel, with a minimum nose width of $\tfrac{1}{16}$ inch, is most satisfactory for grade D plain carbon steel pipe elements O, O, —4½ inches in outside diameter and $\tfrac{1}{16}$ inch in wall thickness. The spacing of the pipe elements O, O preferably is ⅛ inch after tacking, for the best welding results. Two tacks, 180 degrees apart, may be used for initially connecting the pipe elements. If desired, a mechanical jig may be used. A preferred relative positioning of the pipe, welding rod and tip is shown in Fig. 1. A highly satisfactory reinforcement then is obtained by means of a chrome-molybdenum steel welding rod ¼ inch in diameter. This rod melts and flows in fast enough to maintain a high welding speed, and produces a sound weld of high quality.

Before the welding operation is started, it is generally desirable to subject the base metal to a separate preheating operation to adequately prepare it for welding. To do this, the pipe may be held stationary for approximately 20 seconds while the main welding flames W and A, A of the multiflame tip T are directed at the tack on the surface of the pipe opposite the point where the weld is to be started. The rotation of the pipe is then begun in a reverse direction to that to be taken during the welding step, and at a surface speed of about 20 inches per minute in the case of steel pipe of $\tfrac{1}{16}$ inch wall thickness. When the pipe has rotated until the main flames have reached the starting point, the first half of the zone is sufficiently preheated, so that actual welding may be started. The reverse rotation then is stopped and, preferably after the pipe has been held stationary until the pipe walls commence to fuse, the pipe elements O, O are rotated at an initial forward speed of 3 inches per minute, the speed being gradually increased to 4½ inches per minute.

The building up of filler metal from the tack at the start to an adequate level of reinforcement preferably is made gradually to facilitate a good finish. A deep puddle preferably is secured and held fairly evenly, with very little deviation from the predetermined welding speed of 4½ inches per minute; any decrease or increase in welding speed being dependent on the depth of the molten puddle and the appearance of the finished weld behind it. The maintenance of a deep puddle helps to prevent undercutting, and gives ample reinforcement. It is noticeable that little or no porosity occurs in the weld when this is done.

Just before the finish point is reached, the speed of rotation of the pipe parts O, O gradually is increased to facilitate a good finish by avoiding too deep a puddle P. A deep puddle at the finish of the weld causes weld metal to run down over the finished weld as soon as the bottom of the V H closes up. The gas pressures do not have to be reduced when this technique is employed; and as a result the usual difficulties in properly fusing the finish point of the weld are successfully overcome.

The rod feed preferably is maintained by slight positive pressure with a slight turning or twirling motion of the rod R. The rod may be turned continually in one direction, or may be oscillated through about 90 degrees, first in one way and then in the other. The rod R may be fed by hand or by any suitable mechanical means.

The flanking flames Z, Z are spaced laterally from the main welding flames W and A, A and preferably are directed slightly ahead of them. Further, the flanking flames Z, Z are so positioned as to effectively dam or reduce the heat flow from the surface of the V H to the main body of base metal by decreasing the temperature differential therebetween, so that the weld is heated at a substantially uniform rate, and rapid cooling of the walls of the V is prevented. The flanking flames Z, Z also help to form an envelope of hot gases over the puddle P, thus keeping the metal molten longer, permitting inclusions to rise to the surface of the puddle, and facilitating the use of a larger welding rod, as pointed out above.

It should be noted that the widely flanking flames Z, Z are different from the closely-spaced or auxiliary welding flames A, A, the latter of which sweat the surface of the base metal in the V H, add heat to the puddle P, and aid in preventing improper flow of the molten puddle P. The heat-damming flames Z, Z have somewhat the same effect as reducing the thickness of the work or reducing the width of the base metal until there is, in effect, only a very narrow strip of base metal along opposite sides of the V. It will be seen, therefore, that the heat-damming flames Z, Z aid in making either manual or machine welds of good quality, the welding procedure being less critical, whereby the mechanical welding of heavy-walled pipe or the like may be effected without oscillating the blowpipe tip T.

Welded joints made in accordance with this invention are practically without a defect, have high strengths, satisfactory elongations in free bend tests, and a noticeable lack of porosity. An economy in gas consumption, and a decrease in overall welding time over hand welding, also are obtained. In fact, the strength of the weld may be equal to or greater than that of the drill pipe itself.

I claim:

1. A multi-flame welding tip of metal having: a gas inlet chamber, a central main welding flame gas passage, a plurality of spaced angularly related rod-preheating flame gas passages situated above said passage in a longitudinal vertical plane of said tip, a pair of auxiliary welding flame gas passages disposed at opposite sides of said plane in closely flanking relation to said passage, a pair of heat-damming flame gas passages disposed in widely flanking relation to said passage and having their gas outlet passages inclined inwardly, and a plurality of work-preheating gas passages disposed below said passage.

2. A unitary multi-flame welding tip comprising: a body, a central upwardly and forwardly projecting nose portion, and laterally projecting wing portions, a gas inlet chamber in said body, a main welding gas supply passage in said body in communication with said gas inlet chamber, a plurality of spaced rod-preheating gas supply passages situated in said nose portion above said passage and in a longitudinal vertical plane of said tip, a pair of closely flanking auxiliary welding gas supply passages in said body and disposed at opposite sides of said main welding gas passage, a pair of widely flanking heat-damming gas supply passages in said wing portions having gas outlet portions inclined inwardly and adapted to discharge gas ahead of said main welding gas passages, and a plurality of work-preheating gas supply passages in said body under said passage.

3. A multi-flame welding tip comprising a one-piece body of metal having: an upwardly and forwardly projecting nose portion, and laterally projecting wing portions, a cylindrical gas inlet chamber, a central main welding flame gas supply passage in axial alignment with said gas inlet chamber, a plurality of rod-preheating flame gas supply passages situated in said nose portion above said passage and in the central longitudinal vertical plane of said tip, a pair of auxiliary welding flame gas supply passages disposed at opposite sides of said plane in closely flanking relation to said passage, a pair of heat-damming flame gas supply passages in said wing portions widely flanking said passage and having their gas outlet passages inclined inwardly, and a pair of work-preheating gas supply passages disposed below said passage and terminating in two pairs of gas outlet passages.

4. A unitary multi-flame welding tip of metal, having laterally-disposed wing portions and a narrow midportion extending vertically beyond the respective opposite principal surfaces of said wing portions; a gas inlet chamber; a plurality of parallel welding gas passages in said midportion and respectively directed to discharge parallel welding jets in a longitudinal plane passing through said wing portions; a plurality of rod-preheating gas passages within said mid-portion and directed to discharge spaced rod-preheating jets above said welding jets and in a longitudinal plane perpendicular to said plane passing through said welding gas passages; gas passages in the respective wing portions directed inwardly and slightly downwardly to discharge jets in intersecting paths at points in front of the outlets of said parallel passages; a plurality of pairs of diverging work-preheating gas passages in said midportion and directed to discharge work-preheating jets below and in advance of said welding jets; and means establishing communication respectively between each of said gas passages and said gas inlet chamber.

5. A multi-flame welding tip comprising a body having a welding face, a work-preheating face, an upwardly projecting nose portion and laterally projecting wing portions, said body having a gas inlet chamber and a plurality of welding gas passages extending from said chamber to a welding face, said nose portion having rod-preheating faces and a plurality of of spaced rod-preheating gas passages extending from said chamber to said rod-preheating faces, said wing portions having heat-damming faces and heat-damming gas passages extending from said chamber to said heat-damming faces, and said body also having a plurality of work-preheating gas passages extending from said chamber to said work-preheating face.

6. A multi-flame welding tip as claimed by claim 5, wherein said welding face and said heat-damming faces are disposed in spaced parallel planes, and said welding face and said work-preheating face are inclined with respect to each other.

7. Unitary multi-flame welding tip means comprising, in combination, means having a gas inlet chamber, main welding flame gas passage means connected to said gas inlet chamber, rod-preheating flame gas passage means disposed above said main welding flame gas passage means and connected to said gas inlet chamber, auxiliary welding flame gas passage means disposed at opposite sides of said main welding flame gas passage means in closely flanking relation thereto and connected to said gas inlet chamber, heat-damming flame gas passage means disposed in widely flanking relation to said main welding gas passage means and connected to said gas inlet chamber, and work-preheating gas passage means disposed below said main welding gas passage means and connected to said gas inlet chamber.

HARRY V. INSKEEP.